Aug. 17, 1948.  A. J. HORNFECK  2,447,338
TEMPERATURE RESPONSIVE MEASURING SYSTEM
Filed July 12, 1944  3 Sheets-Sheet 1

Inventor
ANTHONY J. HORNFECK
By Raymond D. Junkins
Attorney

Aug. 17, 1948.　　　A. J. HORNFECK　　　2,447,338
TEMPERATURE RESPONSIVE MEASURING SYSTEM
Filed July 12, 1944　　　　　　　　　　　3 Sheets-Sheet 2

D.C. FROM T.C.　　EXCITING FLUX DENSITY　　A.C. SUPPLY TO CONVERTER

Inventor
ANTHONY J. HORNFECK
By Raymond W. Junkins
Attorney

Aug. 17, 1948.    A. J. HORNFECK    2,447,338
TEMPERATURE RESPONSIVE MEASURING SYSTEM
Filed July 12, 1944    3 Sheets-Sheet 3

Inventor
ANTHONY J. HORNFECK
By Raymond D. Junkins
Attorney

Patented Aug. 17, 1948

2,447,338

UNITED STATES PATENT OFFICE 2,447,338

TEMPERATURE RESPONSIVE MEASURING SYSTEM

Anthony J. Hornfeck, Cleveland Heights, Ohio, assignor to Bailey Meter Company, a corporation of Delaware Application July 12, 1944, Serial No. 544,586

15 Claims. (Cl. 73—360)

This invention relates to a system for measuring and/or controlling the magnitude of a variable such as temperature, pressure, rate of fluid flow, position or displacement, although the variable may be of any chemical, physical, electrical, thermal or other characteristic.

In accordance with my invention variations in a variable quantity, quality or condition are translated into variations in an electrical effect, and this effect is then amplified solely through electrical means until sufficient power is available for doing useful work, such as moving an indicator or other exhibiting means, or for regulating the rate of application of an agent contributing to the production or maintenance of the variable.

In devices of the same general type at present known wherein variations in the variable are translated into variations in an electrical effect the necessary amplification is done, at least in part, by mechanical means. There are, therefore, variations in the magnitude of the variable translated into variations in an electrical effect which is then translated into a corresponding mechanical movement, such as the deflection of a galvanometer, and thence usually the mechanical movement is translated back into an electrical effect for operating the exhibiting or control device. Because of the small power available in the first electrical effect such devices usually operate on a periodic or step by step principle. That is to say, upon a change in the variable the exhibiting or control device is not continuously operated in correspondence with such change or changes, but periodically by means of a feeler mechanism an exhibiting or control device is changed an amount corresponding to the amount of change in the variable during succeeding increments of time. Such step by step and feeler mechanisms are well known in the art.

It is evident that such devices are necessarily complicated and delicate and do not correctly exhibit the variable during transient periods. My invention is particularly concerned with the elimination of all mechanical movements between the sensitive device and the exhibiting or control device, leading to simplification and removal of the usual time delay, so that the device accurately exhibits the magnitude of the variable even during transient periods. It is evident that many ancillary advantages will follow, among which may be mentioned as obvious the elimination of wear of mechanical parts and the elimination of the necessity of periodic inspection and adjustment to correct for inaccuracies occasioned by mechanical wear.

The great majority of low level D.-C. measuring systems, such as thermocouple potentiometer recorders, use a galvanometer for detecting or measuring the D.-C. input. A galvanometer is a relatively fragile device and is affected by mechanical vibration and easily damaged by overload or mishandling. Vacuum tube or electron amplifiers for low D.-C. voltages have not been successful because of instability and drift. A particular object of the present invention is to provide apparatus and a new method of detecting and amplifying small D.-C. voltages or currents. The present method involves the use of a device (which I term a reactor converter) which converts a D.-C. signal of varying potential into a greatly amplified A.-C. signal of varying potential. If the D.-C. signal reverses in polarity a consequent reversal of phase is effected in the A.-C. signal. The apparatus includes a pair of iron core reactors and has all of the sensitivity of a galvanometer, as well as the sturdiness of a transformer. There are no delicate moving mechanical parts to wear out or become damaged.

The reactor converter produces a greatly amplified A.-C. output signal of reversing phase, which is supplied to a phase sensitive electronic amplifier and motor control circuit. In this way a thermocouple, having an output of only a few millivolts, is used to position a reversing motor with no intermediate mechanical or moving parts. The reversing motor may position an indicator or recorder and at the same time a potentiometer for balancing the system, which may be of the null type.

The present application constitutes a continuation-in-part of my copending application Serial No. 453,486 filed August 3, 1942.

With the reactor converter arrangement of my invention I may have a potentiometer circuit balanceable in the D.-C. portion or balanceable in the A.-C. portion. The latter circuit is particularly advantageous in connection with thermocouple temperature measurement by eliminating the necessity for a standard cell with periodic hand or automatic balancing against the voltage of the standard cell to insure that the system is accurately measuring the voltage output of the thermocouple.

Figure 1:
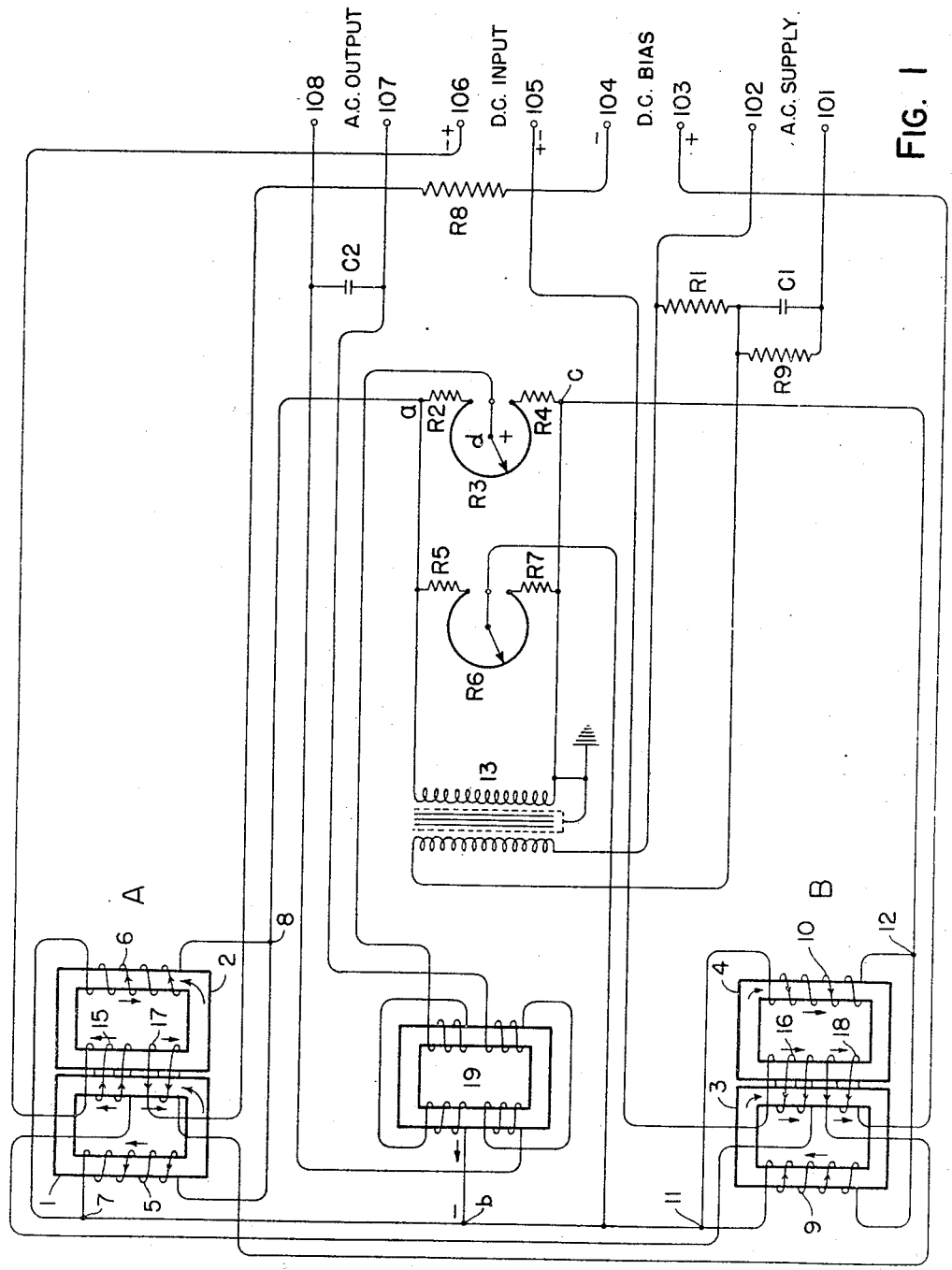
Fig. 1 is a diagrammatic showing of a reactor converter.
Figure 2:
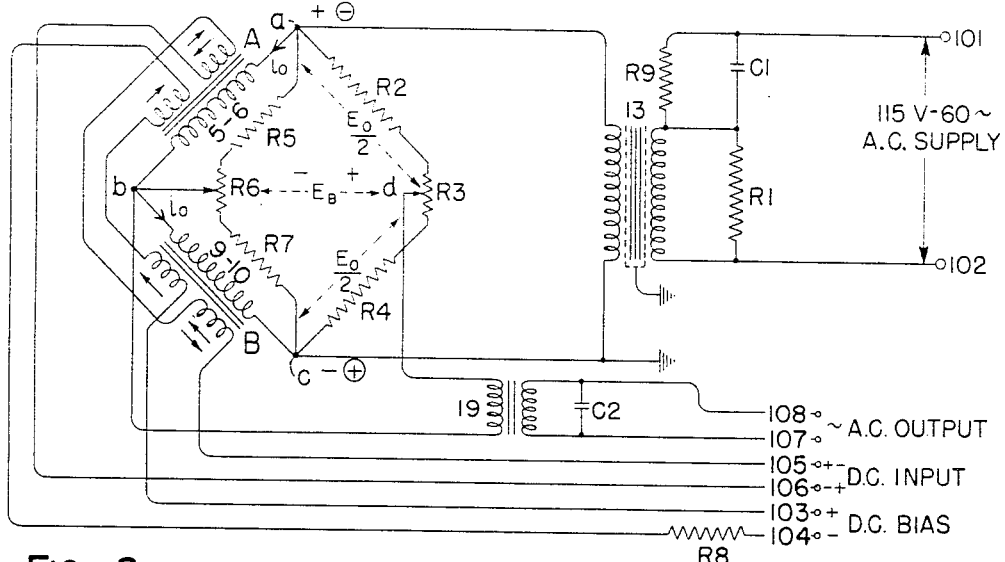
Fig. 2 is a simplified A.-C. bridge circuit including the reactor converter of Fig. 1.

Referring to Fig. 1, I show therein a reactor converter unit consisting of two reactors of special construction arranged in a balanceable bridge circuit which is more diagrammatically illustrated in Fig. 2. Each reactor has a winding about each of its outside legs which are connected in parallel and excited from a relatively low voltage alternating current source. In addition there are two windings on the center leg, one of which carries the D.-C. input current, and the other a D.-C. of constant value or bias. These D.-C. windings are connected in such a way that a D.-C. input of one polarity will set up a magnetomotive force to oppose that set up by the bias in one reactor and to aid the bias in the other reactor. Because of the peculiar properties of the core iron a relatively small change in direct current magnetization has a considerable effect on the magnetic permeability.

Referring specifically to Fig. 1, I designate the reactors A and B as including similar metallic ring cores 1, 2, 3 and 4 of laminations of nickel-copper-iron alloy superior to ordinary grades of silicon transformer iron. Certain applications may not require the sensitivity obtainable with such special lamination alloy. I will, however, describe a preferred construction. Cores 1 and 2 of reactor A are adjacently located with an air or non-metallic gap between the adjacent legs. The cores 3 and 4 of reactor B are similarly arranged.

Each reactor has a winding about each of the two outside legs which are connected in parallel and excited by alternating current. The windings 5 and 6 of reactor A are connected in parallel between the terminal points 7 and 8 and are so wound around the core legs 1 and 2 as (at a given instant) to have a current flow in the direction of the arrows indicated in Fig. 1. Similarly the windings 9 and 10 on the outside legs of the cores 3 and 4 of reactor B are connected in parallel across the terminal points 11 and 12. Thus (in Fig. 2) the windings 5 and 6 are diagrammatically illustrated as a single winding 5—6 between the points $a$, $b$ of the bridge and the windings 9 and 10 are illustrated as a single winding 9—10 between the points $b$, $c$ of the bridge. An insulating and step down transformer 13 is provided between the A.-C. supply and the A.-C. bridge.

The terminal point $d$ of the bridge is adjustable along a zero adjustment or resistance R3 providing means for initially adjusting the bridge into a balanced condition to take care of any slight discrepancy in the exactness of similarity of the reactors A and B, as well as the fixed resistances R2 and R4 which comprise the remaining two legs of the bridge. As is clearly illustrated in Fig. 2 the A.-C. output is taken from conjugate terminals $b$ and $d$ of the bridge.

In addition to the A.-C. windings 5 and 6 of reactor A and the windings 9 and 10 of reactor B there are two D.-C. windings around the center legs of each reactor. Winding 17 of reactor A and winding 18 of reactor B are connected in series and carry a constant bias or direct current of constant value. Winding 15 of reactor A and winding 16 of reactor B are connected in series and carry the D.-C. input current. These D.-C. windings are connected, as shown by the arrows of Fig. 1, in such a way that a D.-C. input of one polarity will set up a magnetomotive force to oppose that set up by the bias in one reactor and to aid it in the other. Because of the peculiar properties of the core iron a relatively small change in direct current magnetization has a considerable effect on the magnetic permeability of the cores.

Referring particularly to Fig. 1, reactor A, it will be observed that at a given instant the A.-C. windings 5 and 6 produce a flux travel in the cores 1 and 2 respectively in a counterclockwise direction, as shown by the arrows. At the same instant, for the condition of direct current polarity assumed, the D.-C. bias winding 17 produces a flux flow downwardly (in the drawing) in the right-hand leg of core 1 and in the left hand leg of core 2. At the same instant the input winding 15 produces an upward flux in the same legs of cores 1 and 2. Thus, for the condition illustrated, the flux produced by the two D.-C. windings 15 and 17 are opposing. At the same instant and under the same conditions the D.-C. windings 16 and 18 of reactor B are additive. The direct current bias is constant and of unchanging polarity. A reversal in polarity of the direct current in the input windings 15 and 16 results in the flux of the windings 15 and 17 being additive while that of the windings 16 and 18 is opposing.

In general the action of the reactor converter is one of changing a direct current signal of given polarity into a greatly amplified alternating current signal of given phase; and the ability of reversing the phase of the alternating current signal 180 degrees when the polarity or sign of the direct current signal is reversed. This is accomplished by an alternating current bridge having two fixed resistance legs R2 and R4 and two windings 5—6 and 9—10 in the remaining legs of the bridge. Phase of the A.-C. output current or voltage depends upon the polarity of the D.-C. input circuit, while the magnitude of the A.-C. output of the bridge depends upon the magnitude of the D.-C. signal.

Current flow through the A.-C. windings 5—6 and 9—10 is inhibited or controlled by a control of the reactance of the windings. Reactance is directly proportional to permeability so that the voltage drop through the winding is controlled by a control of the permeability of the cores on which the windings are located. Thus, specifically referring to Fig. 1, a control of the permeability of the cores 1, 2, 3 and 4 controls the voltage drop through the windings 5, 6, 9 and 10 and the permeability of the cores is under the control of the direct current windings 15, 16, 17 and 18. The value of the current flow through windings 17 and 18 is fixed as a bias in the direction of the arrows. The polarity and value of the current flow in the windings 15 and 16 is determined by the low level direct current which is to be measured. In Figs. 1 and 2 this is indicated merely as "D.-C. input." In other figures of the drawings the D.-C. input is originated by thermocouples or other well known devices which may be connected in potentiometer or bridge circuits.

With the conditions as shown in Figs. 1 and 2 at any given instant, and with the resistances R2 and R4 fixed, the input D.-C. assists the bias D.-C. in reactor B and opposes it in reactor A. The permeability of B is therefore decreased and that of A is increased. The reactance of the winding 9—10 is decreased and the reactance of the winding 5—6 is increased. When the reactance of 9—10 decreases the voltage drop through 9—10 decreases, and therefore $b$ is less positive relative to $c$ than if the reactance of 9—10 were not decreased and (because the voltage drop through A is increased) $b$ is more negative relative to $a$ than otherwise. Therefore the polarity of $b$ and $d$ is as shown, and the flow of current in the system is as shown by the arrows in Fig. 1. If conditions are reversed so that the input flux bucks the bias in B and assists the bias in A, then the polarity of $b$ and $d$ will change and a phase shift of 180 degrees occurs in the A.-C. output.

It is therefore apparent that a change in polarity of the D.-C. input results in a change of phase of the A.-C. output of the bridge. The design of the circuit is such that the value of the D.-C. input is never sufficient to completely cancel the bias. Under a condition of bridge balance the D.-C. input is zero. This is accomplished in any known manner as by a potentiometer system, or other null balance method. When the D.-C. input changes in value, thus throwing the bridge out of balance, the polarity of the D.-C. input determines the phase of the bridge A.-C. output while the magnitude of the D.-C. input determines the magnitude of the A.-C. output. Thus the polarity of the D.-C. input determines whether the winding 16 assists or opposes the winding 18 and whether the winding 15 assists or opposes the winding 17 in control of the permeability of the reactors. The magnitude of the D.-C. input determines the amount of assistance or of opposition to the related bias winding and its current flow.

Reactors A and B are of identical construction having the same number of turns on all corresponding windings. This means that the bridge is normally balanced ($E_b=0$) since the cores of both reactors have the same permeability which results in both A.-C. windings having the same reactance.

Let $X_a$=reactance in ohms of reactor A
$X_b$=reactance in ohms of reactor B
$N$=number of turns of A.-C. winding
$L$=length of magnetic path
$\mu a$=A.-C. permeability of core of reactor A
$\mu b$=A.-C. permeability of core of reactor B
$A$=cross-sectional area of magnetic core
$\omega=2\pi$ frequency of exciting voltage $$X_a = \frac{.4\pi\omega N^2 \mu a A}{L} \quad (1)$$

$$X_b = \frac{.4\pi\omega N^2 \mu b A}{L} \quad (2)$$

The only variables in these equations are the respective A.-C. permeabilities of the cores $\mu a$ and $\mu b$. Hence:

$$X_a = K_1 \mu a \quad (1a)$$
$$X_b = K_1 \mu b \quad (2a)$$

With a D.-C. input in a direction shown by arrows nearest the windings in Fig. 2, the permeability of reactor B will be decreased and that of A increased. An output voltage $E_b$ will result which will be proportional to the D.-C. input with a phase relation to the applied voltage $E_0$ as shown by the signs.

By Kirchoff's law $$\frac{E_0}{2} - i_0 X_a = -E_b \quad (3)$$

$$\frac{E_0}{2} - i_0 X_b = +E_b \quad (4)$$

The current $$i_0 = \frac{E_0}{X_a + X_b}$$

By substituting for $i_0$ in Equations 3 and 4 and solving for $E_b$ I obtain:

$$E_b = \frac{E_0}{2} \frac{(X_a - X_b)}{(X_b + X_a)} \quad (5)$$

Since $X_a = K\mu a$ and $X_b = K\mu b$ $$E_b = \frac{E_0}{2} \frac{(\mu a - \mu b)}{(\mu b + \mu a)} \quad (6)$$

At balance $E_b = 0$ hence $\mu a = \mu b = \mu 0$

For some small value of D.-C. input there will be a correspondingly small change in the D.-C. magnetic field. Let this equal $dH$. In reactor A this change will be negative and will increase the permeability. In B the permeability will decrease. Hence:

$$\mu a = \mu 0 + \frac{(d\mu)}{(dH)} dH \quad (7)$$

and $$\mu b = \mu 0 - \frac{(d\mu)}{(dH)} dH \quad (8)$$

Substituting in Equation 6 for $\mu a$ and $\mu b$ $$dE_b = \frac{E_0}{2} \frac{(d\mu)}{(\mu 0 dH)} dH \quad (9)$$

The factor $$\frac{\mu d}{\mu 0 dH}$$

is the unit rate of change of permeability of the core with change in D.-C. field. It is a basic factor depending on the properties of the core iron. Tests indicate that this factor remains fairly constant over a considerable variation of H. If this is assumed, Equation 9 can be written in integrated form.

$$E_b = \frac{E_0}{2} \frac{(d\mu)}{(\mu 0 dH)} H$$

or $$E_b = (KPE_c) E_d \quad (10)$$

Where $E_b$ = bridge output voltage $\frac{E_0}{2} = E_c$ = A.-C. voltage per reactor $H$ = magnetic field intensity produced by D.-C. input current $$H = \frac{.4\pi N_2 I_d}{L} = \frac{.4\pi N_2 (E_d)}{L(R_d)} = KE_d$$

Where $E_d$ = D.-C. input voltage and $R_d$ = resistance of D.-C. winding
$I_d$ = D.-C. input current
$L$ = length of magnetic path
$P$ = permeability factor = $\frac{(d\mu)}{(\mu 0 dH)}$
$N_2$ = number of turns on D.-C. winding $$K = \frac{.4\pi N_2}{LR_d}$$

The voltage output of the bridge can be calculated by Equation 10 to predetermine the performance of a reactor unit. The magnetic properties of the core iron must however be known. The preceding analysis has shown that the rate of change of permeability with polarizing field is the important factor in determining the sensitivity of the converter.

I utilize two similarly constructed and wound reactors A and B (Fig. 1) as legs in the bridge circuit (Fig. 2). Each of the reactors has a double loop laminated core with adjacent legs spaced by an air gap. The reason for using this construction rather than a single loop core, on one leg of which might be the A.-C. winding and on the other leg the two D.-C. windings, is to keep from having any A.-C. voltage induced in the D.-C. windings. With the double loop as shown the A.-C. effects cancel in the center leg windings whereby only D.-C. is effective.

I have found that the construction illustrated and described is highly preferable to a single core element having three legs in which the outer two legs might have parallel A.-C. windings and the center leg the D.-C. windings. With two closed loops wherein the adjacent legs are separated by an air gap I operate all of the core material in a homogeneous magnetizing condition and prevent the build up of residual magnetism in the center leg. Otherwise I have found that a three leg construction produces a shift in the bridge balance point which cannot be compensated for because it is variable, depending upon the value of the D.-C. input. Such a construction of adjacent separate loop cores shortens the A.-C. flux path relative to a three leg-core wherein the path is through the outermost legs only. The preferred construction decreases the magnetic reluctance of the core by restricting the A.-C. flux to a shorter path.

Figures 5, 6, 7:
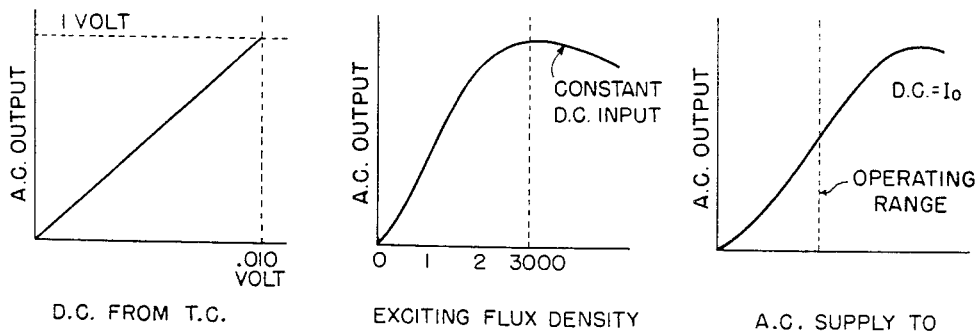
Figs. 5, 6 and 7 are graphs in connection with the other figures of the drawing.

In the particular circuit which I am describing the D.-C. input circuit has a resistance of 330 ohms and the output load impedance should not be less than 10,000 ohms. The bias input requires a source of 1.5 volts D.-C. This circuit has a resistance of 3500 ohms so that the D.-C. bias current is about .0004 ampere. A battery or filtered source of rectified D.-C. is suitable and variations of ±10% in bias voltage as generally tolerable. A supply voltage for excitation of 115 volts, 60 cycles is required. The device is not suitable for operating at other frequencies without modification of the circuit components. Variations of ±10% in voltage or frequency have practically no effect on the zero balance but may cause a slight phase shift as well as some change in magnitude of the A.-C. output for a fixed value of D.-C. input. This converter is designed for a maximum input of 100 micro-amperes. For inputs up to and slightly exceeding this value the A.-C. output voltage is very nearly a linear function of D.-C. input as shown by the curve of Fig. 5. Excessively large values of D.-C. input should be avoided since they may cause a shift in the null balance of the converter due to hysteresis in the reactor cores. No shift in this zero balance greater than ½% of full output will occur if the input is restricted to the designed maximum range of ±100 microamperes. Current as small as .05 microampere and power inputs as small as $10^{-13}$ watts have been detected by this device and measured or used for control using a suitable A.-C. amplifier on the output. This sensitivity compares favorably with that of a good galvanometer.

I have found it particularly desirable to operate the magnetic cores 1, 2, 3 and 4 of reactors A and B at a relatively high flux density. For the particular alloy (Mumetal) used it has been found that a peak A.-C. flux density of about 3000 gauss is optimum. At this point considerable change in A.-C. exciting flux density produced by changes in A.-C. supply voltage has practically no effect on the A.-C. converter output for a given D.-C input (Fig. 6). It has also been observed that in this region of saturation the hysteresis of the core has negligible effect on the output. In other words, if a large D.-C. input is applied and then removed the A.-C. output returns to zero and no appreciable shift of the null balance of the bridge results.

Operation at this relatively high flux density results in a certain amount of harmonic distortion of the A.-C. output caused by variation in permeability over the cycle of applied A.-C. This means that the output voltage may contain certain higher harmonics of 60 cycles. Also at balance, i. e. zero D.-C. and zero 60 cycles A.-C. output, considerable harmonics may be present at the output of the bridge. This is caused by the slight differences between the two reactors which may be balanced for 60 cycles and slightly unbalanced for higher frequencies.

Because of the construction of these reactors and the characteristics of the core alloy, a relatively small change in D.-C. magnetization has a considerable effect on the magnetic permeability. This change in permeability being opposite in the two reactors produces a corresponding opposite change in reactance, and consequently unbalances the bridge. The output voltage of the bridge is hence proportional to the magnitude of the D.-C. input and its phase relation to the supply voltage is dependent on the polarity of the input.

The null adjusting potentiometer R3 to which the point $d$ adjustably connects is used to attain accurate balance of the bridge and zero in-phase output for zero D.-C. input.

The loss balance potentiometer R6 is used to compensate for unbalance in effective resistance of the two reactors. The point $b$ adjustably contacts the resistance R6 and is adjusted until the out of phase or 90° component of output is zero for zero D.-C. input.

When resistances R3 and R6 are properly adjusted, the bridge is perfectly balanced for fundamental frequency and its 60-cycle output is zero for zero D.-C. input. Once adjusted, the null balance is quite stable and is shifted less than ±½% for variations of bias, A.-C. supply voltage, frequency and ambient temperature as great as ±10%.

The bridge output voltage is increased in the ratio of 5 to 1 by the transformer 19 in order to more nearly match the input characteristics of electronic amplifiers.

Condenser C2 across the secondary of the transformer 19 is approximately tuned to the 60 cycle reactance of the bridge. Hence it minimizes the distortion in the A.-C. output and acts as a low impedance shunt for objectionable higher harmonics of 60 cycle which remain at zero balance since the reactance of a condenser varies inversely as the frequency. At resonance the current flowing through the condenser C2 in series with the reactance and resistance of the bridge is in phase with the supply voltage. This results in a 90° lag in the voltage across the condenser behind the bridge supply voltage. The voltage supplied to the bridge is made to lead the line voltage by almost 90° to correct for the 90° lag produced by the harmonics filtering condenser C2. This phase lead is produced by the capacitor-resistance network R1, C1 on the input of the shielded bridge supply transformer 13. R1 is small compared to the condenser reactance $$\frac{1}{\omega C}$$

so that the current through R1 and the voltage across it leads the line voltage by almost 90°. R9 is a high resistance to discharge C' when the power circuit is opened.

Figure 3:
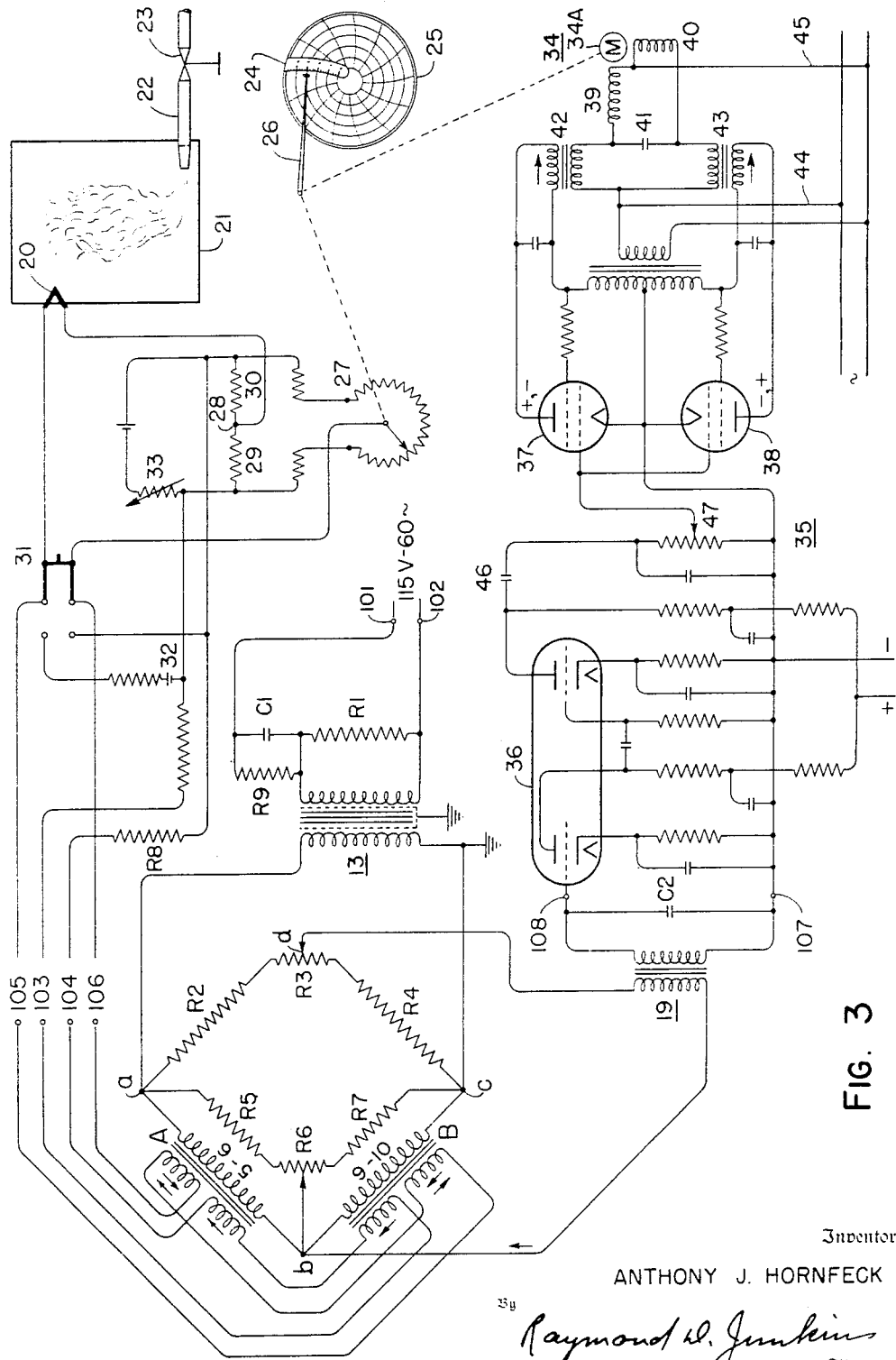
Fig. 3 is a complete circuit showing for thermocouple measurement of temperature.

Fig. 3 is a more complete wiring diagram including the reactor converter of Figs. 1 and 2 in a circuit for the measurement of temperature through the measurement of the D.-C. voltage generated by a thermocouple 20 sensitive to the temperature within a furnace 21 which is supplied by fuel through a burner 22 having a control valve 23. Desirably the temperature is indicated on a scale 24 and recorded on a chart 25 through the agency of a recording pointer 26. The thermocouple 20 is connected in a standard potentiometer circuit including a balancing potentiometer resistance 27. The cold junction 28 is located between manganin coil 29 and nickel coil 30 comprising compensation for changes in cold junction temperature.

A double pole double throw switch 31 is provided for the D.-C. input. In the position shown, for normal operation, the thermocouple-potentiometer system is connected to the input windings 15 and 16 of the reactors A and B. With the switch 31 thrown to its alternate position the potentiometer circuit is disconnected and the standard cell 32 is connected for checking the system. An adjustable resistance 33 is provided in the potentiometer circuit in known manner.

For positioning the indicator pointer 26 and the balancing resistance 27 I provide a motor indicated generally at 34. Between the A.-C. output transformer 19 and the motor 34 is a phase sensitive two stage amplifier 35 for control of the motor 34. A double triode resistance coupled device 36 is provided, sensitive to the phase of the output of the transformer 19 and thereby sensitive to phase of the output of the reactor converter bridge. The double triode 36 provides a two-stage amplifier for control of the motor control tubes 37 and 38. Upon a departure of thermocouple voltage from any given value the output of the transformer 19 is varied in phase and magnitude in selected correspondence therewith. This change in phase of the output of the transformer 19 is employed to selectively operate the motor 34 in one direction or the other to vary the potentiometer 27 in proper sense to rebalance the system.

The motor 34 is illustrated as a capacitor-run alternating current motor having a wound rotor 34A and stator windings 39 and 40, the latter constituting running coils electrically 90° apart. It is provided with a capacitor or condenser 41 which, when the motor is rotating, is in series with either the winding 39 or the winding 40 depending upon the desired direction of rotation. Such a motor runs as a two-phase alternating current motor and not only may be reversed as to direction of rotation, but has speed control when rotating in either direction.

The arrangement in general provides a D.-C. control current for two saturable core reactors 42 and 43. These reactors are connected in the motor circuit in such a way that the speed of the motor rotor 34A depends on the degree of saturation of the reactor and the direction of rotation depends on which reactor is being saturated. The motor circuit loop comprises the output windings of the reactors 42, 43, the motor windings 39 and 40 and the capacitor 41. The loop is provided with alternating current energy from a source by way of conductors 44, 45. The saturating windings may in the condition of equilibrium be unsaturated, partially saturated, or fully saturated. So long as the degree of saturation of the windings is the same, then the motor control loop is in a steady state of equilibrium or balance and no rotation of the rotor 34A occurs. Upon unbalance of the degree of saturation of the windings, i. e. with either the saturation of the one winding being decreased relative to the other, or with the saturation of one winding being increased relative to the other, there will result a rotation of the rotor 34A in a predetermined direction and at a speed determined by the unbalance of the output of the saturable core reactors, which is determined by the difference in degree of saturation of the windings. When the motor is rotating the capacitor 41 is always in series with either the winding 39 or with the winding 40 and the motor is termed a capacitor-run motor.

The motor 34 is adapted to position the balancing potentiometer 27, as well as the indicator 26 and may control the valve 23. I thus provide a means for indicating and continuously recording the value of the temperature to which the thermocouple 20 is sensitive and at the same time balancing the electrical network.

The output winding of the transformer 19 is connected in the input circuit of the double triode 36 for controlling the motor control tubes 37, 38 which are preferably arranged in circuit to have opposite polarity. That is the anode of the tube 37 is positive during one-half cycle and the anode of the tube 38 is positive during the remaining half cycle. The transformer 19 output of one phase will then cause a voltage to be applied to tube 37 which will be in phase with the anode voltage, effecting rotation of the motor 34 in one direction. Unbalance of the system, and phase of the output transformer 19 in the opposite direction, will then cause a voltage to be applied to the grid of the tube 38 which will be in phase with the anode voltage and accordingly will effect operation of the motor 34 in the opposite direction.

The output circuit of the device 36 includes a source of direct current and certain resistances. The grids of the device 36 may be biased so that it is not conducting or is conducting a predetermined amount. Such direct current as normally flows through the output circuit has no effect upon the potential impressed upon the grids of the tubes 37 and 38, by virtue of a condenser 46. Upon passage of alternating current through the output of the transformer 19, however, the current in the output of the device 36 becomes pulsating in character, which will pass through the condenser 46 and render either the tube 37 or the tube 38 conducting selectively in accordance with the phase of the output of transformer 19.

The tubes 37 and 38 may normally be maintained non-conducting. To provide a high degree of sensitivity in some cases it may be preferable to maintain the tubes normally somewhat conducting, in which case the pulsating current originating due to unbalance of the system will selectively render one or the other of the tubes more conducting.

As previously stated, the phase of the output voltage of transformer 19 depends upon the sense of change of voltage through the thermocouple 20 and the polarity of the direct current input to the reactor converter. Likewise the phase of the current in the output circuit of the device 36 will depend upon the sense of change in the input of the reactor converter. The pulsating current passing through the output circuit of the device 36 is utilized to control the current transmission through the pair of electron discharge devices or motor control tubes 37 and 38, the output circuits of which are in circuit with the saturating windings of reactors 42, 43 for control of the motor 34. Unbalance in the saturation of reactors 42 and 43 in direction and in amount determines the direction and speed of rotation of the rotor 34A.

The pulsating component of the voltage across the plate resistance of the device 36 is impressed upon the grids of the tubes 37 and 38 through the condenser 46 which inhibits the passage of direct current. It will, therefore, be solely the component of the voltage across the output circuit of the device 36, produced by the voltage from the output of the transformer 19, which will be effective for controlling the grid-cathode potential relationship of the tubes 37 and 38. As the tubes 37 and 38 have opposite polarity, the particular tube rendered conducting during each half cycle when the proper anode-cathode potential relationship exists will be determined by the polarity or phase of the voltage from the output of the transformer 19, and therefore by the polarity of the D.-C. input to the reactor converter. The particular saturating winding of the reactors 42, 43 which is energized to overbalance the other is selectively determined in dependence upon the sense of unbalance of the potentiometer system. As heretofore mentioned, operation of the motor 34 serves to position the index 26 and at the same time to vary the potentiometer resistance 27 to rebalance the system. The possibility of movably adjusting the point of connection of the grids of the tubes 37 and 38 along a resistor 47 provides a sensitivity adjustment for the amplifier 35.

Figure 4:
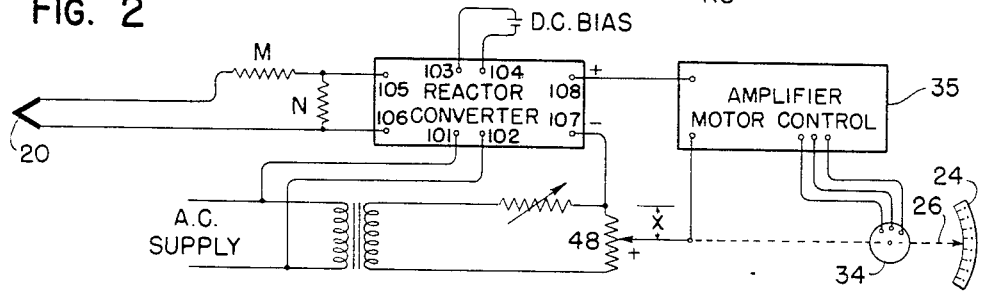
Fig. 4 is a wiring diagram of another arrangement for thermocouple temperature measurement.

In Fig. 4 I show schematically and in simplified manner a temperature measuring circuit wherein a rebalancing is accomplished in the A.-C. output circuit from the reactor converter; rather than in the D.C. input circuit, as is the case in Fig. 3. Such an arrangment obviates the necessity for the usual D.-C. potentiometer circuit including a standard cell 32. In Fig. 4 the thermocouple 20 is used directly as a D.-C. input to the reactor converter. I provide a cold junction compensator comprising a manganin winding M and a nickel winding N. This simplified circuit continually applies to the input of the reactor converter a D.-C. potential of constant polarity representative of the temperature to which the thermocouple 20 is subjected. In other words, I disclose a decided departure from the customary potentiometer thermocouple circuit which is balanced to a null condition following departure from balance. Referring to Fig. 4 it will be appreciated that with a D.-C. input of constant polarity that the A.-C. output of the reactor converter at terminals 107, 108 will be of constant phase but varying potential. This, which is in effect the A.-C. output of the thermocouple, I balance against a portion X of the potentiometer 48 energized from the A.-C. supply so as to be of opposite phase. When unbalance occurs the resultant A.-C. voltage will be phased in accordance with the predominant circuit to actuate the motor 34 in the desired direction to effect balance by adjusting the magnitude of $\bar{X}$. Such a circuit is self-compensating for variations in voltage or frequency of the A.-C. supply for obvious reasons.

Regardless of the source of D.-C. input, which I have indicated by way of example as being a thermocouple, I provide an A.-C. automatic potentiometer for measuring low level D.-C. The converter output is a straight line function of supply A.-C. volts so that no voltage regulator is required on A.-C. reference. In Fig. 7 I have plotted the A.-C. output against the A.-C. supply to the converter.

While the circuits of Figs. 3 and 4 are primarily of the same general form in that a low level D.-C. input is converted into a greatly amplified A.-C. output, nevertheless the two circuits are distinctly dissimilar insofar as balancing of the network is concerned. In the circuit of Fig. 3 the usual potentiometer null balancing is accomplished in the low level D.-C. input. This has always been a source of complication and difficulty, particularly through the necessity of checking the working battery periodically either by hand or automatically against a standard cell. The circuit of Fig. 4 obviates these difficulties by accomplishing its null balancing in the amplified A.-C. portion of the circuit, namely, the output of the reactor converter. Many practical advantages are attendant in the latter circuit which forms an important improvement in the present invention.

While the circuit of Fig. 4 has been illustrated as using a thermocouple as the source of low level D.-C. at the input to the reactor converter, it will be appreciated that this is an example only and that many possibilities exist for provision of a low level D.-C. source to be measured.

While I have chosen to illustrate and describe certain preferred embodiments of my invention, it will be understood that this is by way of example only and that I am not to be limited thereto.

What I claim as new, and desire to secure by Letters Patent of the United States, is:

1. A reactor converter for converting a low-level direct current voltage of reversing polarity into an alternating current voltage of reversing phase, comprising in combination, a balanceable electrical network having four legs, two of said legs having fixed voltage drop thereacross and the remaining two legs adapted to have varying voltage drop thereacross, magnetic core elements associated with said remaining pair of legs, direct current windings associated with said core elements for varying the saturation thereof, a source of low-level direct current of reversing polarity connected to said direct current windings, a resistance in parallel across said two remaining legs adjustably divided across the two legs, and means sensitive to the output of the network to rebalance the network following an unbalance thereof.

2. The combination of claim 1 including initial balancing means comprising a resistance adjustably divided in series with said two fixed legs.

3. The combination of claim 1 including means eliminating harmonics in the alternating current output of reversing phase from said network, and phase shift means in connection with the alternating current supply to said network compensating for phase distortion in the network output caused by said eliminating means.

4. A system for measuring the magnitude of a low voltage direct current signal including, in combination, means for supplying a direct current signal at a low voltage to be measured, a reactor converter receiving said D.-C. signal, means for energizing said reactor converter from an A.-C. source of constant potential, said reactor converter producing an A.-C. voltage of substantially fixed phase and at a voltage proportional to the voltage of the D.-C. signal, a circuit energized from said A.-C. source and adjustable to provide an A.-C. voltage of different values, and means operating in response to the difference between the voltage from said converter and the voltage from said circuit for adjusting the latter until the voltages are equal.

5. A system for measuring the output of a thermocouple including, in combination, a reactor converter receiving low-level direct current of variable potential from said thermocouple, means for energizing said reactor converter from an A.-C. source of constant potential, said reactor converter putting out alternating current at a potential proportional to the D.-C. potential received, a potentiometer circuit energized from an A.-C. source and including means adjustable to provide an alternating current potential of adjustable amplitude, means connecting said last mentioned potential and said alternating current output in opposition, and means operating in response to the difference between said last mentioned potential and said A.-C. output for adjusting said adjustable means.

6. A temperature measuring system including, in combination, a thermocouple sensitive to the temperature to be measured and producing a low-level direct current signal at a potential proportional to the temperature, a reactor converter receiving the D.-C. signal from said thermocouple, means for energizing said reactor converter from an A.-C. source of constant potential, said reactor converter producing an amplified A.-C. voltage proportional to the D.-C. signal received and of fixed phase, a potentiometer circuit energized from said source of A.-C., adjustable means for selecting a portion of the voltage drop in said potentiometer circuit and opposing it to the voltage produced by said reactor converter, and means operating in response to the unbalance of said opposed voltages for adjusting said selecting means to effect a rebalance.

7. A temperature measuring system including, in combination, a thermocouple sensitive to the temperature to be measured and producing a low-level direct current signal at a potential proportional to the temperature, a reactor converter receiving the D.-C. signal from said thermocouple, means for energizing said reactor converter from an A.-C. source of constant potential, said reactor converter producing an amplified alternating current potential proportional to the D.-C. signal received and of fixed phase, a resistance energized from said source of A.-C., means including a movable contact engaging said resistance for selecting a portion of the potential across the latter and opposing it to the potential produced by said reactor converter, and reversible means responsive to the value and direction of unbalance of said potentials and operative to position said contact in a direction to effect a balance of said potentials.

8. A reactor converter for converting a low-level direct current of variable potential into an alternating current of representative but higher potential, comprising in combination, an electrical network having four legs, one pair of said legs having fixed impedance and the remaining pair having varying impedance, a source of A. C. energizing said pairs in parallel with the legs of each pair in series, magnetic core elements associated with the second pair of legs, direct current windings associated with the said core elements for varying the saturation thereof, a source of low-level direct current of varying potential connected to said direct current windings, a potentiometer connected in parallel to the second pair of legs and arranged to be adjustably divided between them, and an A. C. output circuit for said network connected between the legs of each pair.

9. A reactor converter for converting a low-level direct current into a representative alternating current of higher level comprising in combination, a Wheatstone bridge having an alternating current source of energy, a pair of arms of fixed impedance and a pair of arms of varying impedance connected in parallel across said source with the arms of each pair in series, magnetic core elements associated with the second pair of arms, two direct current windings associated with the core elements for each arm, one of said windings for each core being energized at a constant direct current level, a source of low-level direct current of varying potential connected to the other direct current windings to vary the saturation of the cores thereof, an output circuit for said bridge connected between the junctions of the arms of the pairs and means to adjust the output circuit for balance and zero in-phase output for zero direct current input of low level.

10. A reactor converter for converting a low-level direct current into a representative alternating current of higher level comprising in combination, a Wheatstone bridge having an alternating current source of energy, a pair of arms of fixed impedance and a pair of arms of varying impedance connected in parallel across said source with the arms of each pair in series, magnetic core elements associated with the second pair of arms, two direct current windings associated with the core elements for each arm, one of said windings for each core being energized at a constant direct current level, a source of low-level direct current of varying potential connected to the other direct current windings to vary the saturation of the cores thereof, an output circuit for said bridge connected between the junctions of the arms of the pairs and means connected in said bridge circuit to adjust the 90° phase component of output to zero at zero direct current input of low level.

11. A reactor converter for converting a low-level direct current into a representative alternating current of higher level comprising in combination, a Wheatstone bridge having an alternating current source of energy, a pair of arms of fixed impedance and a pair of arms of varying impedance connected in parallel across said source with the arms of each pair in series, magnetic core elements associated with the second pair of arms, two direct current windings associated with the core elements for each arm, one of said windings for each core being energized at a constant direct current level, a source of low-level direct current of varying potential connected to the other direct current windings to vary the saturation of the cores thereof, an output circuit for said bridge connected between the junctions of the arms of the pairs, a potential increasing transformer connected in said output circuit, and means to tune said transformer to substantially match the impedance of the bridge at the frequency of the energizing current for the bridge.

12. The combination of claim 11 wherein the tuning means is a condenser across the output of said transformer.

13. A reactor converter for converting a low-level direct current into a representative alternating current of higher level comprising in combination, a Wheatstone bridge having an alternating current source of energy, a pair of arms of fixed impedance and a pair of arms of varying impedance connected in parallel across said source with the arms of each pair in series, magnetic core elements associated with the second pair of arms, two direct current windings associated with the core elements for each arm, one of said windings for each core being energized at a constant direct current level, a source of low-level direct current of varying potential connected to the other direct current windings to vary the saturation of the cores thereof, an output circuit for said bridge connected between the junctions of the arms of the pairs, a potential increasing transformer connected in said output circuit, a condenser to tune the output circuit to substantially match the bridge impedance and a network associated with the A. C. input to the bridge to advance the line voltage to compensate for the lag caused by said condenser.

14. The combination of claim 13 in which said network comprises a condenser in series in the A. C. input and a resistor in parallel to said bridge.

15. An automatic temperature measuring system including, in combination, a thermocouple sensitive to the temperature to be measured and producing a variable low-level direct current signal proportional to the temperature, a network energized from a source of alternating current and having an A.-C. output of amplified value, means for subjecting said D.-C. signal on said network so that the output of the latter is proportional to said signal but at an amplified value, a potentiometer energized from said source of A.-C. and having means to adjust its output, means opposing the network A.-C. output to the potentiometer output, electromagnetic means responsive to the difference in potential and phase directions of said last mentioned outputs, said electromagnetic means being arranged to adjust said potentiometer to balance said outputs, and an indicator actuated by said electromagnetic means.

ANTHONY J. HORNFECK.

REFERENCES CITED

The following references are of record in the file of this patent:

UNITED STATES PATENTS

| Number | Name | Date |
| --- | --- | --- |
| 1,779,619 | Potter | Oct. 28, 1930 |
| 1,973,279 | Bernarde | Sept. 11, 1934 |
| 1,979,311 | Borden | Nov. 6, 1934 |
| 2,113,164 | Williams | Apr. 5, 1938 |
| 2,173,841 | Hooven | Sept. 26, 1939 |
| 2,250,712 | Johnson | July 29, 1941 |
| 2,310,955 | Hornfeck | Feb. 16, 1943 |
| 2,322,498 | Zeitlin | June 22, 1943 |
| 2,350,329 | Hornfeck | June 6, 1944 |
| 2,355,567 | Sparrow | Aug. 8, 1944 |
| 2,358,103 | Ryder | Sept. 12, 1944 |
| 2,367,869 | Jones | Jan. 23, 1945 |